(12) United States Patent
Bent et al.

(10) Patent No.: US 9,801,330 B2
(45) Date of Patent: Oct. 31, 2017

(54) METER ROLLER CARTRIDGE FRAME FOR AN AGRICULTURAL METERING SYSTEM

(71) Applicant: CNH Industrial Canada, Ltd., Saskatoon (CA)

(72) Inventors: Ethan Curtis Stephen Bent, Saskatoon (CA); Dennis W. Chahley, Saskatoon (CA); Dennis George Thompson, Saskatoon (CA); Gordon Anthony Engel, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 78 days.

(21) Appl. No.: 14/932,764

(22) Filed: Nov. 4, 2015

(65) Prior Publication Data

US 2017/0118905 A1    May 4, 2017

(51) Int. Cl.
*A01C 7/10* (2006.01)
*A01C 7/04* (2006.01)

(52) U.S. Cl.
CPC .............. *A01C 7/102* (2013.01); *A01C 7/046* (2013.01)

(58) Field of Classification Search
CPC .. A01C 7/04; A01C 7/10; A01C 7/102; A01C 7/107
USPC ........................................................ 111/178
See application file for complete search history.

(56) References Cited

U.S. PATENT DOCUMENTS

| | | |
|---|---|---|
| 2,148,975 A | 2/1939 | Agren |
| 3,362,143 A | 1/1968 | Gullickson |
| 3,608,783 A | 9/1971 | van der Lely |
| 3,655,226 A | 4/1972 | Cowan |
| 3,817,560 A | 6/1974 | Guertin |
| 3,982,670 A | 9/1976 | Brass |
| 4,175,405 A | 11/1979 | Smith et al. |
| 4,402,626 A | 9/1983 | Recker |
| 4,473,016 A | 9/1984 | Gust |
| 4,500,017 A | 2/1985 | Machnee |
| 4,508,243 A | 4/1985 | Deutsch et al. |
| 4,601,372 A | 7/1986 | Swales et al. |

(Continued)

FOREIGN PATENT DOCUMENTS

| | | |
|---|---|---|
| DE | 3823532 A1 | 1/1990 |
| DE | 3909968 A1 | 9/1990 |

(Continued)

OTHER PUBLICATIONS

1910 Air Commodity Cart; John Deere; 2013; Retrieved at www.deere.com/wps/dcom/en_US/products/equipment/planting_and_seeding_equipment/air_seeding/1910_commodity_air_cart/1910_commodity_air_cart.page.

(Continued)

*Primary Examiner* — John G Weiss
(74) *Attorney, Agent, or Firm* — Rebecca L. Henkel; Rickard K. DeMille (57) ABSTRACT

A method of configuring an agricultural metering system includes coupling one of a first meter roller cartridge frame and a second meter roller cartridge frame to a meter roller to form a meter roller cartridge. The first meter roller cartridge frame has one or more first openings having a first aggregate area, and the second meter roller cartridge frame has one or more second openings having a second aggregate area, different from the first aggregate area. The method includes engaging the meter roller cartridge with a meter box of the agricultural metering system.

15 Claims, 9 Drawing Sheets

(56) References Cited

U.S. PATENT DOCUMENTS

| | | | |
|---|---|---|---|
| 4,615,626 A | 10/1986 | Iwaki | |
| 4,664,290 A | 5/1987 | Martin et al. | |
| 4,948,017 A | 8/1990 | Heep et al. | |
| 5,178,333 A | 1/1993 | Barber et al. | |
| 5,522,669 A | 6/1996 | Recker | |
| 5,549,060 A * | 8/1996 | Schick | A01C 7/12 111/178 |
| 5,632,212 A | 5/1997 | Barry | |
| 5,634,737 A | 6/1997 | Voss et al. | |
| 5,845,818 A | 12/1998 | Gregor et al. | |
| 5,878,679 A * | 3/1999 | Gregor | A01C 15/04 111/174 |
| 5,924,370 A | 7/1999 | Gregor et al. | |
| 6,062,575 A | 5/2000 | Mickel et al. | |
| 6,138,591 A | 10/2000 | Horsch | |
| 6,240,861 B1 | 6/2001 | Memory | |
| 6,644,225 B2 | 11/2003 | Keaton | |
| 6,928,940 B2 * | 8/2005 | Soun | A01C 7/06 111/178 |
| 7,104,339 B2 | 9/2006 | Garner | |
| 7,765,943 B2 | 8/2010 | Landphair et al. | |
| 8,001,915 B2 * | 8/2011 | Friggstad | A01C 7/088 111/178 |
| 8,281,724 B2 * | 10/2012 | Snipes | A01C 7/102 111/178 |
| 9,043,949 B2 * | 6/2015 | Liu | A01C 7/081 |
| 9,497,899 B2 * | 11/2016 | Glowa | A01C 7/04 |
| 9,591,799 B2 * | 3/2017 | Henry | A01C 7/042 |
| 2009/0035055 A1 | 2/2009 | Rosch et al. | |
| 2009/0062020 A1 | 3/2009 | Edwards et al. | |
| 2010/0247233 A1 | 9/2010 | Frank et al. | |
| 2012/0174842 A1 | 7/2012 | Friggstad | |
| 2012/0174844 A1 | 7/2012 | Friggstad | |
| 2012/0211508 A1 | 8/2012 | Barsi et al. | |
| 2012/0266795 A1 | 10/2012 | Silbernagel et al. | |
| 2012/0325131 A1 | 12/2012 | Thompson et al. | |
| 2015/0216109 A1 | 8/2015 | Meyer et al. | |

FOREIGN PATENT DOCUMENTS

| | | |
|---|---|---|
| EP | 1537768 A1 | 6/2005 |
| EP | 1570716 A2 | 9/2005 |
| WO | 0022912 A1 | 4/2000 |
| WO | 2010040502 A1 | 4/2010 |

OTHER PUBLICATIONS

1665 Air Seeder Mount Inoculant Applicator; Valmar; 2013; Retrieved at http://www.valmar.com/S=0/products/view/65-series-implement-mount-granular-applicators.

* cited by examiner

METER ROLLER CARTRIDGE FRAME FOR AN AGRICULTURAL METERING SYSTEM

BACKGROUND

The disclosure relates generally to an agricultural metering system, and more specifically, to a meter cartridge frame for a meter box of an agricultural metering system.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. In certain configurations, air carts are towed behind the seeders to deliver a desired flow of seeds to the row units.

Air carts generally include a seed storage tank, an air source (e.g., a blower) and a metering system. The seeds are typically gravity fed from the storage tank to the metering system that distributes a desired volume of seeds into an air flow generated by the air source. The air flow then carries the seeds to the row units via conduits extending between the air cart and the seeder. The metering system typically includes meter rollers or other metering devices that regulate the flow of seeds based on meter roller geometry and rotation rate.

However, it may be difficult to control flow of seeds at a given speed. For example, at low rotation rates, it may be difficult to control the rate of flow of seeds from the meter roller. These difficulties can result in inaccuracies for planting operations.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a method of configuring an agricultural metering system includes coupling one of a first meter roller cartridge frame and a second meter roller cartridge frame to a meter roller to form a meter roller cartridge, wherein the first meter roller cartridge frame has one or more first openings having a first aggregate area, and the second meter roller cartridge frame has one or more second openings having a second aggregate area, different from the first aggregate area, and engaging the meter roller cartridge with a meter box of the agricultural metering system.

In a second embodiment, a meter roller cartridge for an agricultural metering system includes a frame having a first section configured to enable material to enter a meter roller within the frame and a second section configured to block material from entering the meter roller, wherein the first and second sections are configured to control flow of the material into the meter roller.

In a third embodiment, an agricultural metering system includes a meter roller having a first segment and a second segment, a first meter roller cartridge frame configured to rotatably support the meter roller, wherein the first meter roller cartridge frame includes a first section configured to enable flow of material into the first segment of the meter roller, and a second section configured to block flow of the material into the second segment of the meter roller.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
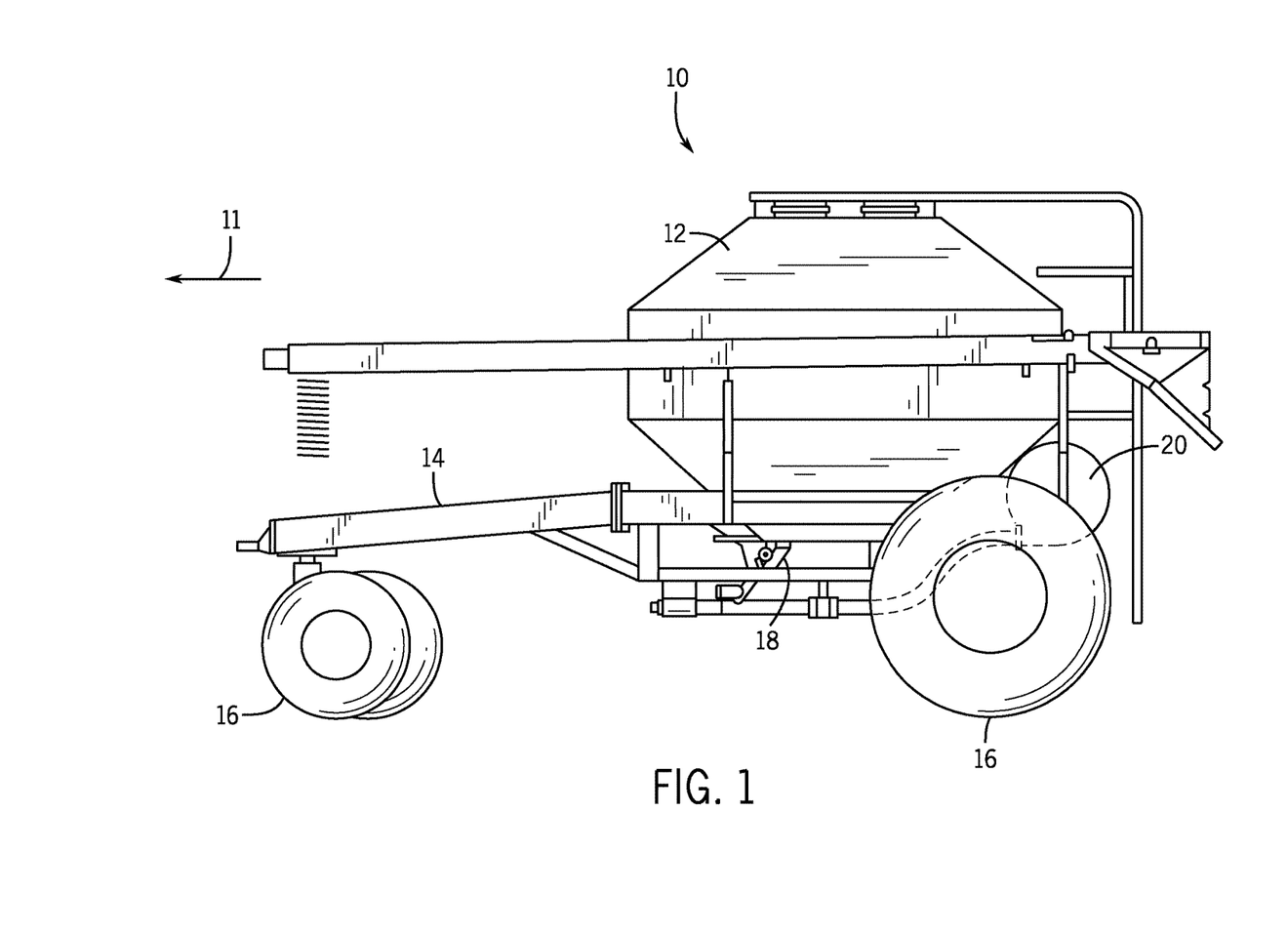
FIG. 1 is a side view of an embodiment of an air cart, including a metering assembly configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11. In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or wheat, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
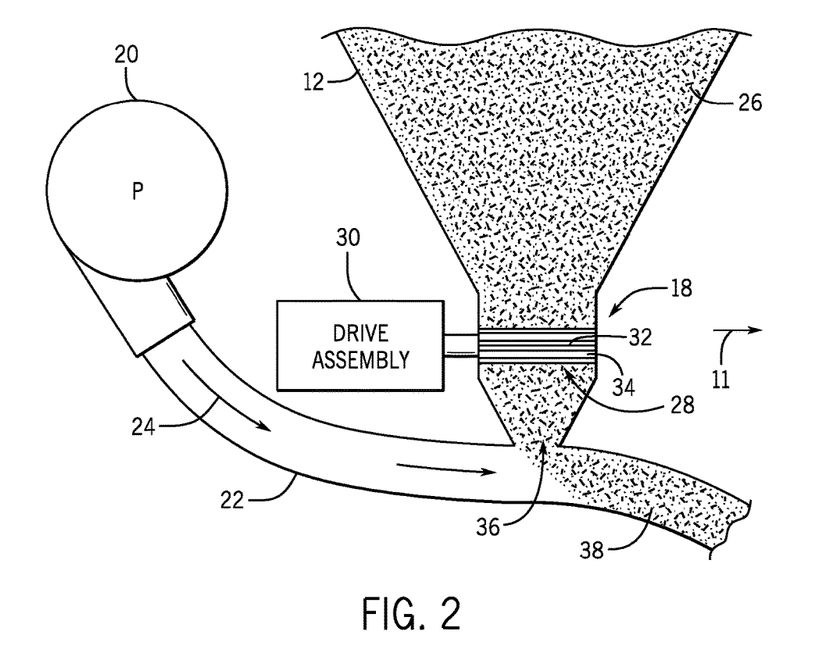
FIG. 2 is a schematic view of an embodiment of the metering assembly of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 (e.g., rotatable metering devices) configured to regulate the flow of material 26 into the air flow 24. For example, certain metering systems 18 may include twelve meter rollers 28, each disposed within an independent housing and each configured to flow particulate material into a respective conduit 22 for distribution to one or more respective row units of the agricultural implement. Such metering systems are known as "12-run" metering systems. However, in alternative embodiments, the metering system 18 may include more or fewer meter rollers, e.g., 1, 2, 3, 4, 5, 6, 7, 8, 9, 10, 11, 13, or more.

In the illustrated embodiment, the meter roller 28 is coupled to a drive assembly 30 configured to drive the meter roller 28 to rotate. In certain embodiments, the drive assembly 30 may include a drive unit, such as an electric or hydraulic motor, configured to drive one or more meter rollers to rotate. In further embodiments, the drive assembly 30 may be coupled to a wheel (e.g., via a gear assembly) such that rotation of the wheel 16 drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the material 26 (e.g., agricultural product) disposed within the respective recess 34 downwardly, thereby transferring the material 26 to the conduit 22. The number and geometry of the flutes 32 are particularly configured to accommodate the material 26 being distributed. Certain meter rollers 28 may include six flutes 32 and a corresponding number of recesses 34. Alternative meter rollers may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26. While the illustrated meter roller includes flutes, it should be appreciated that in alternative embodiments, the meter roller may include other protrusions, and/or the recesses may be omitted.

In the illustrated embodiment, the meter roller 28 is oriented substantially parallel to the direction of travel 11 of the air cart. As used herein, substantially parallel may refer to an angle of about 0 to 45 degrees, about 0 to 30 degrees, about 0 to 15 degrees, about 0 to 5 degrees, or about 0 to 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration, the rotation rate of the meter roller 28 controls the flow of material 26 into the air stream 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduits, where the seeds and/or fertilizer are deposited within the soil.

Figure 3:
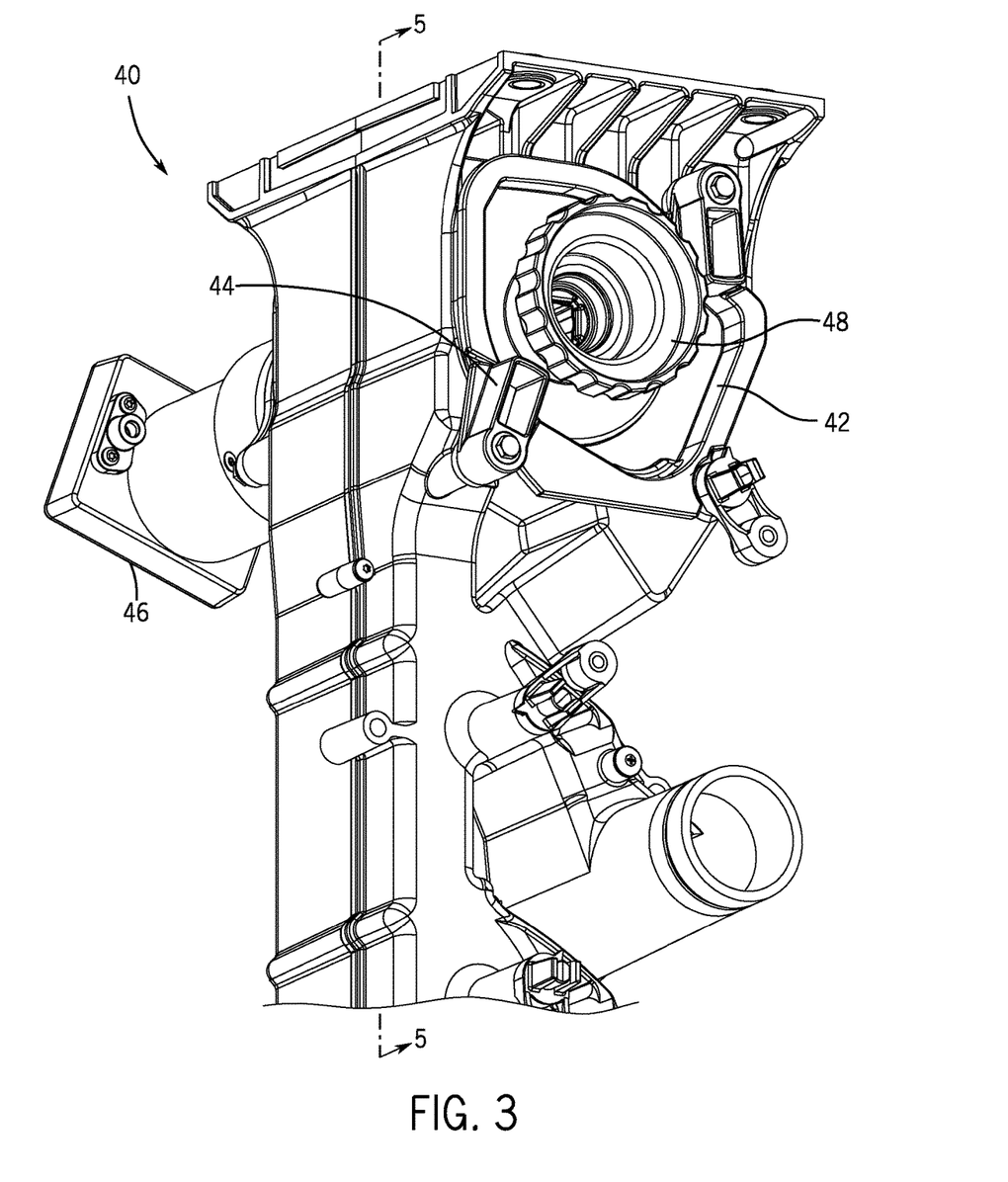
FIG. 3 is a perspective view of an embodiment of a meter box of the agricultural metering assembly of FIG. 1.

FIG. 3 is a perspective view of an embodiment of a meter box 40 of the agricultural metering system 18. As illustrated, the meter box 40 houses a modular meter roller cartridge 42. While one cartridge 42 is housed within the meter box 40 of the metering system 18 of the present embodiment, alternative embodiments of the meter box may house multiple cartridges (e.g., 2-10). In the present embodiment, the metering system 18 is configured to enable the cartridge 42 to engage the meter box 40 via an opening in the meter box. Operation of the meter roller 28 is enabled while the cartridge 42 is engaged with the meter box 40. The cartridge 42 has a cross-sectional shape that substantially corresponds to the cross-sectional shape of the opening of the meter box. In the present embodiment, a cartridge locking tab 44 (e.g., latch) is configured to selectively block passage of the cartridge 42 out of the meter box 40, thereby retaining the cartridge 42 in the meter box 40. While the meter box 40 of the system 18 includes a rotatable latch, the cartridge locking tab 44 may be a spring latch, bolt latch, or any suitable type of locking mechanism known in the art. The cartridge locking tab 44 may include a recess that engages a corresponding notch on the cartridge 42 to further secure the cartridge from disengaging from vibrations or movement. The cartridge 42 may be removed by rotating the locking tab 44 in a first direction and extracting the cartridge 42. Further, the cartridge 42 may be inserted by engaging the cartridge 42 with the meter box 40 and rotating the locking tab 44 in a second direction, opposite the first direction.

In the illustrated embodiment, the meter box 40 may include a drive unit 46 that drives rotation of the meter roller 28 while the cartridge 42 is engaged. The cartridge 42 includes a releasable bearing coupler 48. As further described below, the releasable bearing coupler 48 facilitates rotation of the meter roller 28 within the cartridge 42 and facilitates removal of the meter roller 28 from the cartridge 42. As discussed above, it may be desirable to control flow of the material through the meter roller 28.

Figure 4:
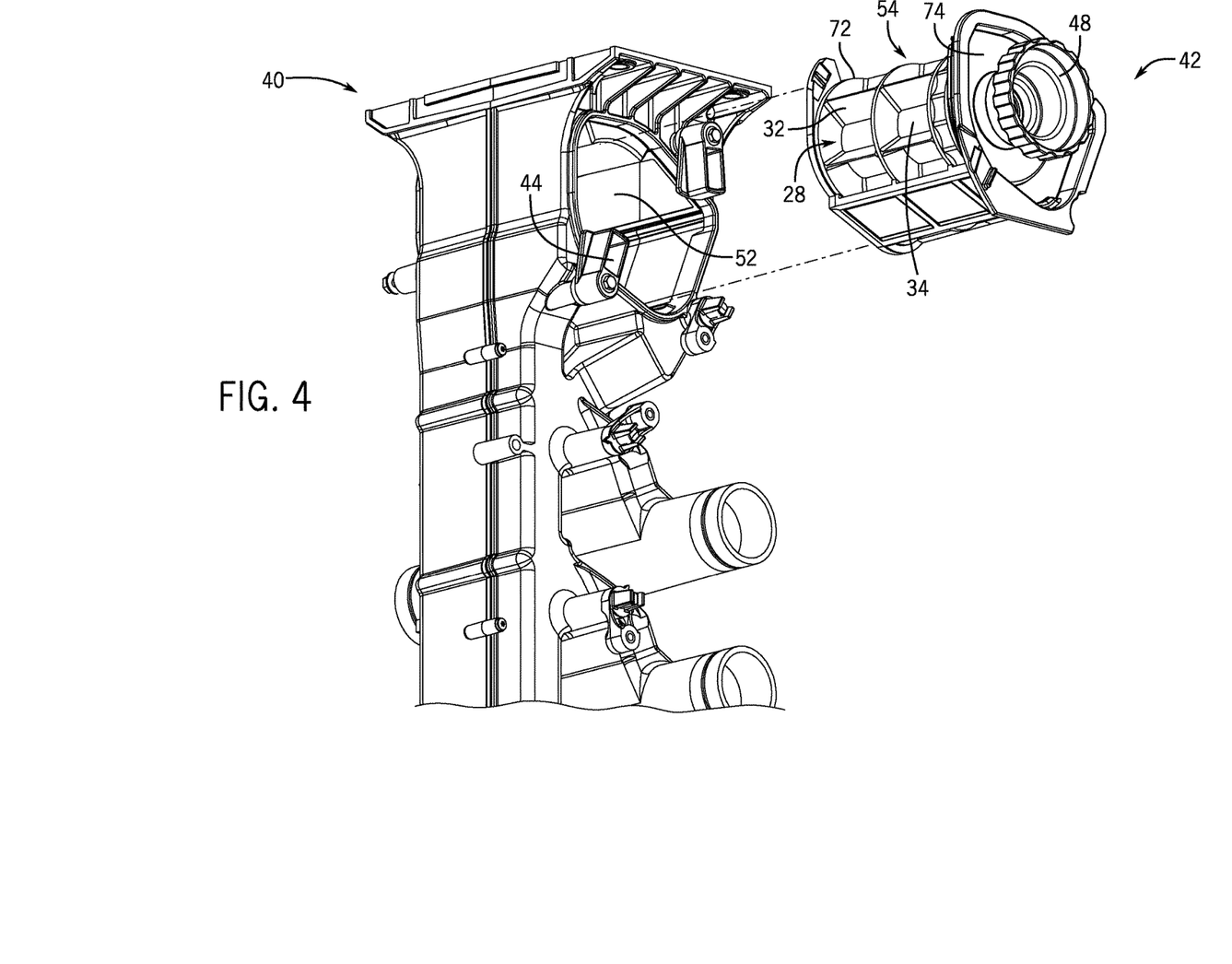
FIG. 4 is a perspective view of an embodiment of a meter roller in a meter roller cartridge frame removed from a housing of the meter box of FIG. 3.

In the illustrated embodiment, the metering system 18 employs a modular meter roller cartridge 42 to facilitate removal and installation of the meter roller 28. FIG. 4 is a perspective view of the meter box 40 of FIG. 3 with an embodiment the cartridge 42 removed from the meter box 40. For removal of the cartridge 42, the operator may unlock the cartridge locking tabs 44 (e.g., via rotation of the tabs) and pull the cartridge 42 out of the meter box 40. As shown in FIG. 4, the cross-sectional shape of the cartridge 42 substantially corresponds to the shape of the meter box opening 52. The cartridge 42 includes the releasable bearing coupler 48 and the meter roller 28.

The meter roller 28 includes the flutes 32 and recesses 34 which are visible through the meter roller opening 54 in the cartridge 42. The meter roller 28 is supported longitudinally on a first side 72 and a second side 74 of the meter roller cartridge 42. The second side 74 is supported by the releasable bearing coupler 48. Once the cartridge 42 is removed, the releasable bearing coupler 48 may be disconnected and removed. Removal of the bearing coupler enables an operator to remove the meter roller 28 through the opening 54. Further, the operator may then insert the same meter roller 28 or another meter roller into a different cartridge frame to control the flow of material 26 into the meter roller 28. The frame may include an exterior of the cartridge that forms an enclosure between the tank 12 and the meter roller 28. The cartridge frame may block the material 26 from entering one or more segments of the meter roller 28 and enable the material 26 to enter one or more other segments of the meter roller.

Figure 5:
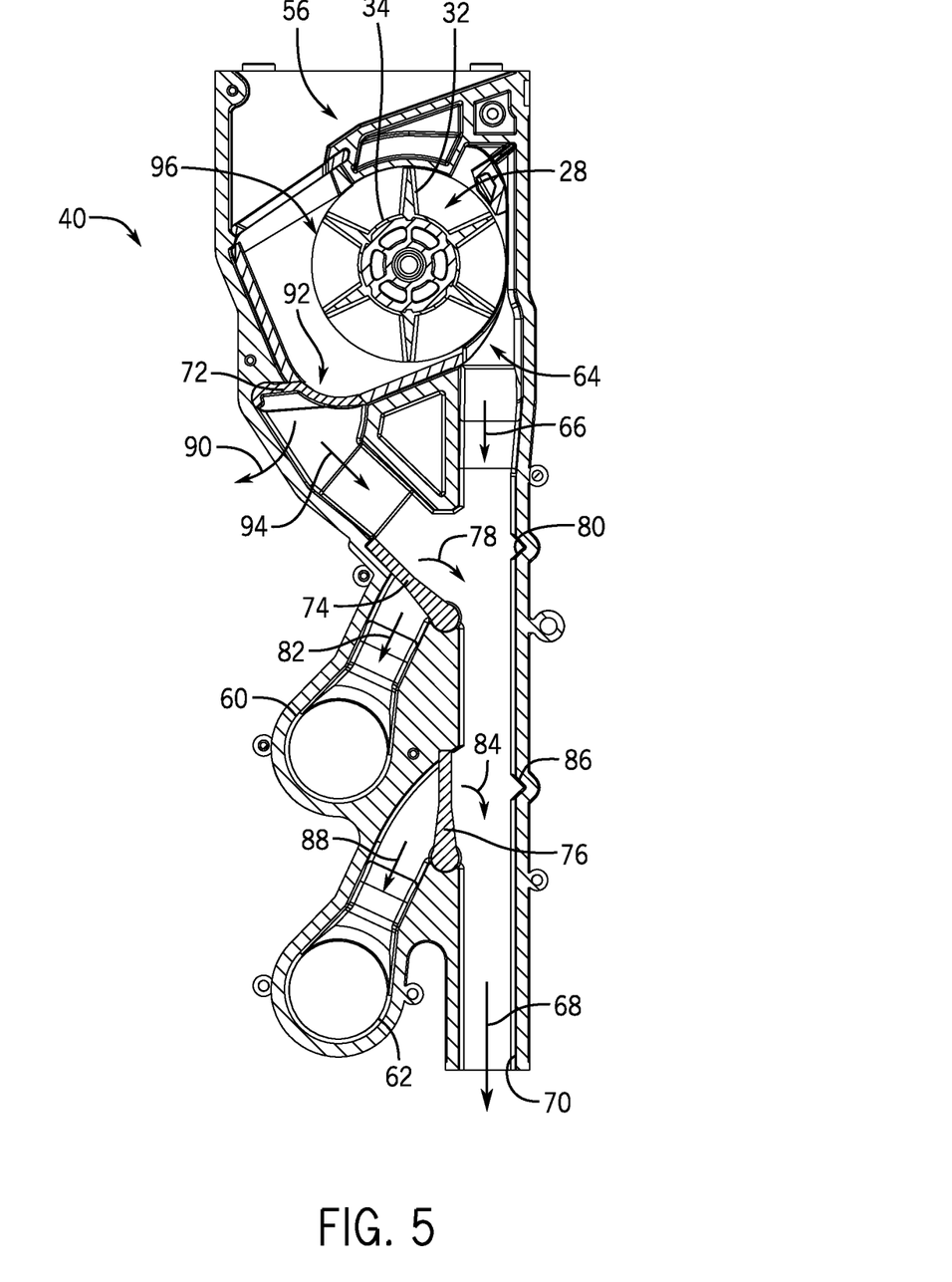
FIG. 5 is a cross-sectional view of the meter box of FIG. 4, taken along line 5-5.

FIG. 5 is a cross-sectional view of the meter box 40 of FIG. 4, taken along line 5-5. The meter box 40 is configured to receive material 26 from the tank 12 via an inlet 56. The meter box 40 houses the meter roller 28 that controls a flow of particulate material 26 into a first conduit connector 60 or into the second conduit connector 62 via rotation of the meter roller 28. To determine a relationship between meter roller rotation and particulate material flow rate (e.g., into the first conduit connection 60 or into the second conduit connection 62), the meter roller 28 may be calibrated (e.g., prior to operation of the air cart, periodically, etc.). The calibration process includes rotating the meter roller 28 through a desired number of rotations, weighing the particulate material output by the meter roller, and then dividing the material weight by the desired number of rotations to determine a product flow rate (e.g., product weight per meter roller rotation). For example, the meter roller 28 may be driven to rotate such that particulate material flows through the opening 64 in a direction 66. The material then exits the seed meter 40 in a direction 68 through an opening 70. An operator may collect the material output through the opening 70, weigh the material, and then determine the product flow rate (e.g., based on the number of meter roller rotations that produced the material output).

The meter box may include a first gate 72, a second gate 74, and a third gate 76. Once the calibration process is complete, the operator may open the second gate 74 to direct the material into the first conduit connector 60 (e.g., if material flow into the first conduit connector 60 is desired). As illustrated, the second gate 74 may be rotated in a direction 78 from the illustrated closed position, which blocks flow into the first conduit connector 60, to an open position, which facilitates flow into the first conduit connector 60. With the second gate 74 in the open position, the gate 74 engages a recess 80 in the seed meter 40, thereby directing the flow of material from the direction 66 into the first conduit connector 60 in the direction 82 and blocking the flow of material through the opening 70. Upon completion of seeding operations, or if material flow into the second conduit connector 62 is desired, the second gate 74 may be returned to the closed position, as illustrated.

If material flow into the second conduit is desired, the operator may open the third gate 76 to direct the material into the second conduit connector 62. As illustrated, the third gate 76 may be rotated in a direction 84 from the illustrated closed position, which blocks flow into the second conduit connector 62, to an open position, which facilitates flow into the second conduit connector 62. With the third gate 76 in the open position, the gate 76 engages a recess 86 in the seed meter 40, thereby directing the flow of material from the direction 66 into the second conduit connector 62 in the direction 88 and blocking the flow of material through the opening 70. Upon completion of seeding operations, or if material flow into the first conduit connector 60 is desired, the third gate 76 may be returned to the closed position, as illustrated.

Once seeding operations are complete, a seed gate positioned above the inlet 56 may be transitioned to a closed position to block material flow into the seed meter 40. The material remaining in the seed meter 40 may then be discharged via a clean-out process. Alternatively, the seed gate may remain open such that the material from the supply 12 discharges through the seed meter 40. The clean-out process includes closing the second and third gates 74 and 76, and then opening the first gate 72. As illustrated, the first gate 72 may be rotated in a direction 90 from the illustrated closed position, which blocks material from bypassing the meter roller 28, to an open position, which establishes an opening 92. The opening 92 enables material to bypass the meter roller 28 and flow in a direction 94 toward the opening 70, thereby discharging the remaining material from the seed meter 40.

To control flow of the material 26 through the meter box 40 and the meter roller 28, a meter cartridge frame may be selected to block a desired portion of the material 26 from entering the opening 96 to the flutes 32 and recesses 34 of the meter roller 28. For example, various meter cartridge frames may be selected for the meter roller 28 to control the flow of material into the opening 96.

Figure 6:
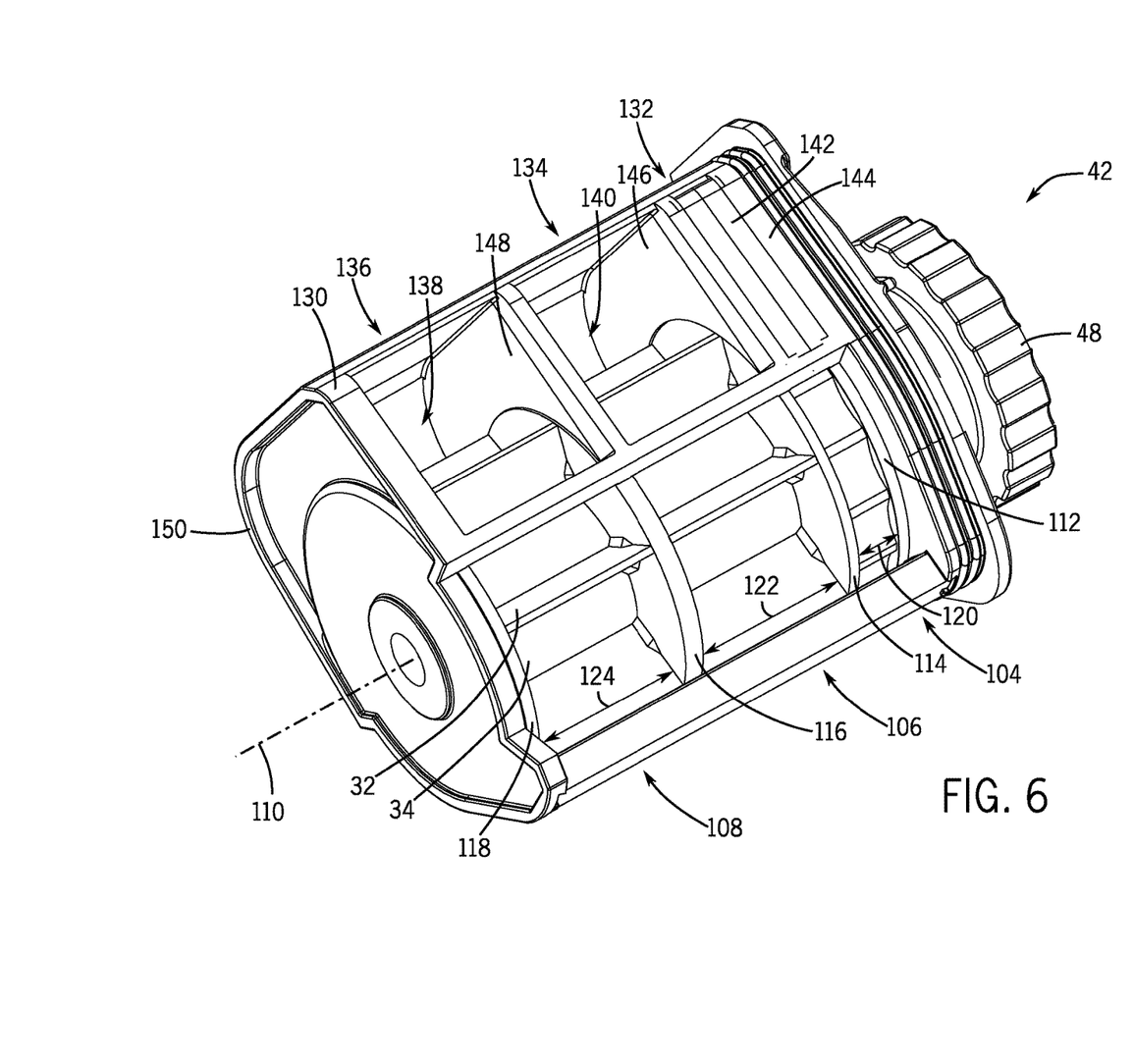
FIG. 6 is a perspective view the meter roller of FIG. 4 in a full width meter roller cartridge frame.

FIG. 6 is a perspective view of the meter roller 28 in the meter roller cartridge 42. The cartridge 42 includes the releasable bearing coupler 48 configured to engage the meter roller 28 and to support an end of the meter roller 28. The meter roller 28 includes three segments 104, 106, and 108 each configured to control flow of the agricultural product 26 to the conduit 22. As illustrated, the first segment 104 includes small, shallow recesses 34, and thus may be used for small seeds or fertilizer that is metered at a low flow rate. Each of the second segment 106 and third segment 108 have deeper and larger recesses 34, and, thus, may be used for agricultural products 26 that are metered at a higher rate.

The segments 104, 106, and 108 of the meter roller 28 are axially (e.g., along axis 110) divided by rings 112, 114, 116, and 118. In the illustrated embodiment, a first ring 112 and a second ring 114 define an axial width 120 of the first segment 104 of the meter roller 28. As mentioned above, the first segment 104 has shallow recesses 34. In addition, the first segment 104 has a smaller axial width 120, which may be desirable for products that are metered at a low flow rate. The second segment 106 of the meter roller 28 is bordered by the second ring 114 and a third ring 116, which define an axial width 122. Additionally, the third ring 116 and a fourth ring 118 define an axial width 124 of the third segment 108 of the meter roller 28. The second axial width 122 and the third axial width 124 may be the substantially equal, as illustrated, or may be different to enable various product flow rates. While the meter roller 28 shown in FIG. 6 includes three segments, any suitable number of segments may be included (e.g., 2, 3, 4, 5, or more segments) to enable an operator to control flow rates of materials, as discussed in detail below.

The meter roller cartridge 42 includes a frame 130 that controls which segments 104, 106, and 108 receive material from the tank 12 based on a configuration of openings positioned upstream of the segments 104, 106, and 108. Various meter roller cartridge frames may include various opening configurations to control the material entering the meter roller 28. The frame 130 of FIG. 6 is an embodiment of a full width frame having three sections 132, 134, and 136. The sections 132, 134, and 136 may have approximately the same width as corresponding segments 104, 106, and 108 of the meter roller. For example, first section 132 may have approximately the same width 120 as the first segment 104 of the meter roller. Similarly, the second section 134 and the third section 136 of the frame 130 may have approximately the same widths as the second segment 106 and the third segment 108 of the meter roller. While the meter roller 28 has three segments 104, 106, and 108 and the cartridge frame has three sections, any suitable number of segments/sections may be employed (e.g., 2, 3, 4, 5 or more segments/sections). In addition, the size of each segment/section may be particularly selected to control flow of material entering the meter roller. The sections 134 and 136 include respective openings 138, 140 (e.g., aligned with opening 96 of FIG. 5) to receive the material 26 from the storage tank 12. In the illustrated embodiment, the first section 132 includes a clip 142 that covers the first segment 104. The openings 138 and 140 of the full width frame enable material 26 to be metered by the first and second segments of the meter roller 28. The openings 138 and 140 may have an aggregate area (e.g., sum of open area of openings 138 and 140) that enables a higher amount of product to flow through the meter roller than other frames. For example, the full width frame may facilitate a higher product flow rate as compared to the half width frame and the extra fine frame discussed below. By enabling more material to enter the cartridge 42, the full width frame may be suited for products that are metered at a high rate (e.g., as compared to the half width and extra fine frame).

The frame 130 includes slats 146 and 148 that align with the rings 114 and 116 to divide the material 26 into a first portion, a second portion, and/or a third portion. As illustrated, the slats 146 and 148 are contoured to match a circumference of the rings 114 and 116 to block the material 26 flowing in to one segment 104, 106, and 108 from being transferred to another segment 104, 106, and 108 of the meter roller 28. In addition, the clip 142 blocks an opening of the first section 132 of the frame 130 to block material 26 from entering the first segment 104. Further, the slat 146 of the full width frame 130 and the ring 114 prevent material from entering the first segment 104 from the second segment 106 along the axial direction 110 (e.g., due to vibrations, etc.).

Figure 7:
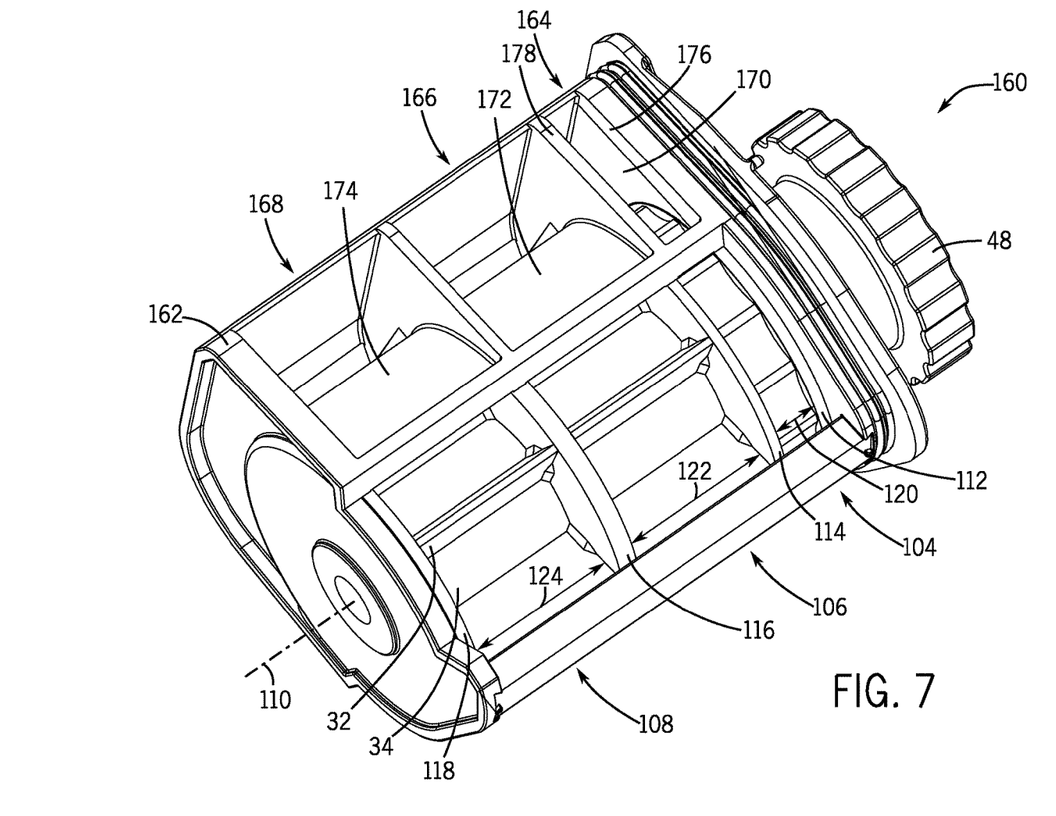
FIG. 7 is a perspective view of the meter roller of FIG. 4 in a fine meter roller cartridge frame.

FIG. 7 is a perspective view of the meter roller 28 (e.g., the meter roller 28 of FIG. 6) inserted in another meter roller cartridge 160 having an extra fine frame 162. The extra fine frame 162 includes three sections 164, 166, and 168. The sections 164, 166, and 168 have approximately the same widths as corresponding segments 104, 106, and 108 of the meter roller 28, respectively. The first section 164 has an opening 170 configured to receive the material 26 from the storage tank 12. The second and third sections 166 and 168 include blocking portions 172 and 174, respectively, to block the flow of material 26 into the second and third segments 106 and 108 of the meter roller 26. The cartridge 160 having the extra fine frame 162 may be inserted into the meter box to facilitate distribution of fine material and/or to provide a low flow rate. By blocking flow of the material 26 second and third sections 166 and 168 via the blocking portion 172 and 174, less material 26 may flow through the meter box 40, as compared to the full width frame 130 discussed above. The opening 170 of the extra fine frame 162 may have an aggregate area different from the aggregate area of the full width frame described above to enable a lower amount of product to flow through the meter roller than the full width frame. Further, the blocking portions 172 and 174 are configured to enable material 26 in the product tank 12 to drain through sections 166 and 168. That is, the blocking portions 172 and 174 are configured to enable material 26 to bypass the meter roller 28 and flow through the opening 92 described with respect to FIG. 5 to discharge the remaining material (e.g., during clean-out). Similar to the meter roller cartridge 42 of FIG. 6, the meter roller cartridge 160 having the extra fine frame 162 includes slats 176 and 178 that align with and are contoured to match the circumference of the rings 112 and 114. The slats 176 and 178 and the corresponding rings 112 and 114 block material 26 from flowing from the first segment to the second segment 106 along the axial direction 110 of the meter roller 28. While the blocking portions 172 and 174 are molded as part of the meter roller cartridge frame in FIG. 7, other embodiments may have attachable clips or covers that cover sections of the meter roller (e.g., similar to the clip 142 of FIG. 6). Moreover, while the first section 164 is configured to receive a clip, the first section 164 may be integrally molded.

Figure 8:
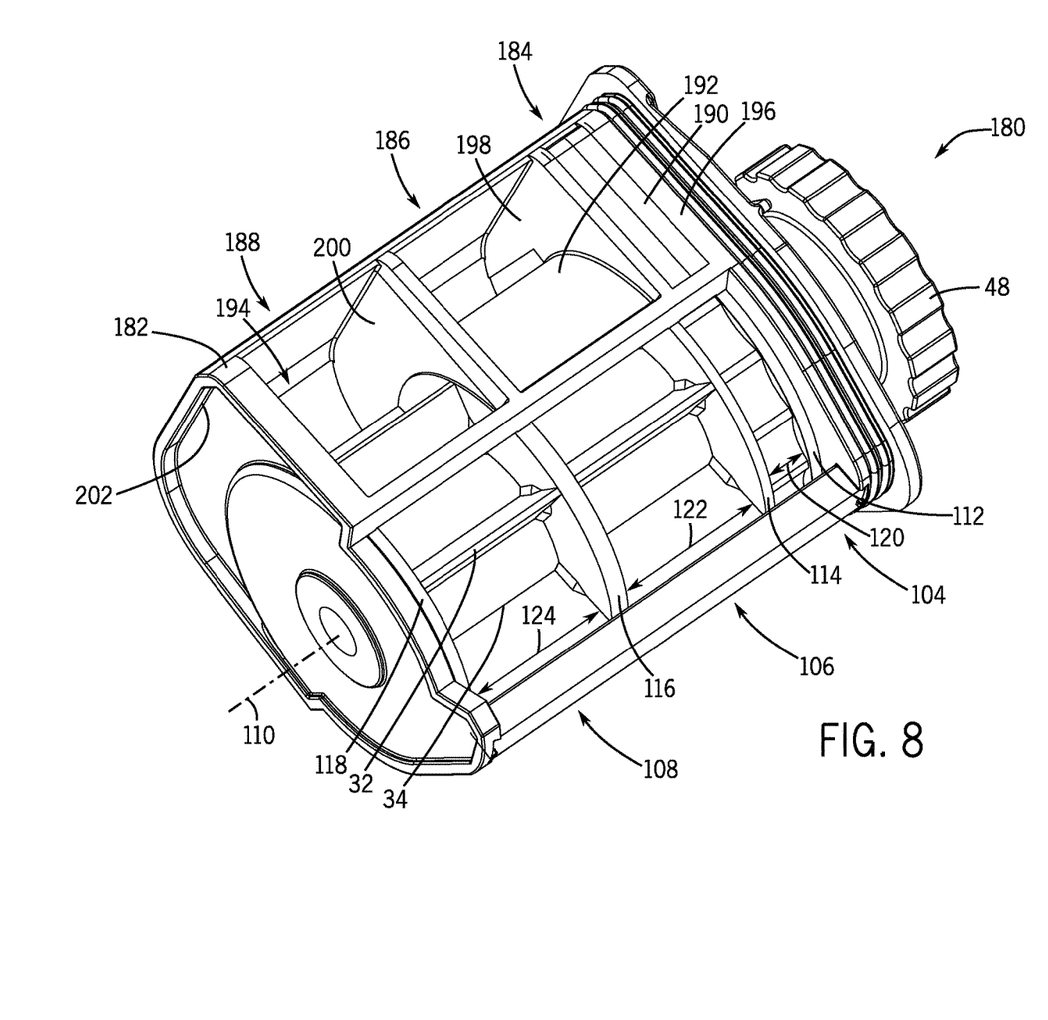
FIG. 8 is a perspective view of the meter roller of FIG. 4 in a half width meter roller cartridge frame.

FIG. 8 is a perspective view of the meter roller 28 inserted in another meter roller cartridge 180 having a half width frame 182. The half width frame includes three sections 184, 186, and 188. The sections 184, 186, and 188 have approximately the same widths as corresponding segments 104, 106, and 108 of the meter roller 28, respectively. The first section 184 includes a clip 190 configured to block the material 26 from entering the first segment 104 of the meter roller 28. The second section 186 includes blocking portion 192 molded as part of the frame 182 to block material 26 from entering the second segment 106. The cartridge 182 having the half width frame 162 may be inserted into the meter box 40 to enable the meter roller 28 to provide a lower flow rate than the flow rate from the cartridge 42 of FIG. 6 having the full width frame 130. By blocking flow of material 26 into the second segment 106 via the blocking section 192 and into the first segment 104 via the clip 190, the material flow rate through the half width frame 182 may be less than the material through the full width frame 130. However, the half width frame 182 may facilitate higher flow rate than the extra fine frame 162 due to the larger size of the opening 194, the height of the flutes 32, and/or the depth of the recesses 34. That is, an aggregate area of the opening 194 may enable a higher flow rate than the extra fine frame 162 but a lower amount than the full width frame 130. Further, the blocking section 192 is configured to enable material 26 in the product tank 12 to drain through sections 166 and 168. That is, the blocking section 192 is configured to enable material 26 to bypass the meter roller 28 and flow through the opening 92 described with respect to FIG. 5 to discharge the remaining material (e.g., during clean-out). The half width frame 182 includes slats 198 and 200 and that align with and are contoured to match the circumference of the rings 116 and 118. The slats 200 and 202 align with and are contoured to match the circumference of the rings 116 and 118 to block the material 26 from exiting the third segment 108 along the axial direction 110 of the meter roller 28. For example, the slat 200 may align with the ring 116 to block the material from transferring entering the second segment 106. While the blocking portion 192 is shown molded as part of the meter roller cartridge in FIG. 8, other embodiments may have attachable clips or covers that cover parts of the meter roller similar to the clip 190. Similarly, while the clip 190 is an attachable clip in FIG. 8, any suitable blocking portion may be used to block the material from entering the first section 184, such as a molded blocking portion.

Figure 9:
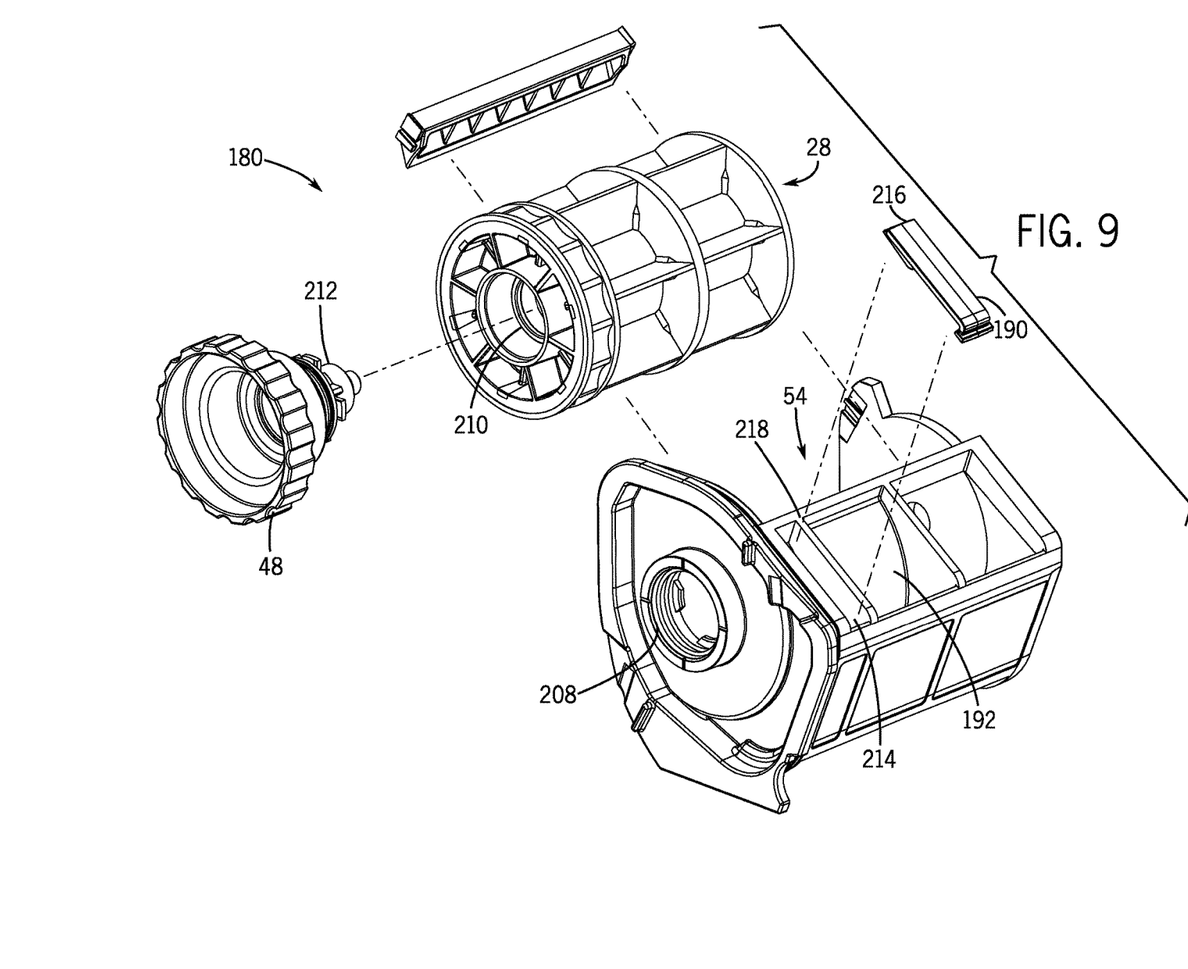
FIG. 9 is an exploded perspective view of the half width meter roller cartridge frame of FIG. 8.

FIG. 9 is an exploded perspective view of the meter roller cartridge 180 having the half width frame 182 separated from the meter roller 28. To engage the meter roller 28 with frame 182, the meter roller 28 may be inserted into the frame 182 via the opening 54. When the meter roller is inserted into the opening 54, an opening 208 of the frame 182 aligns with an opening 210 in the meter roller 28 to enable an operator to insert a shaft 212 of the releasable bearing coupler 48 through the frame opening 208 into the opening 210 of the meter roller 28. The releasable bearing coupler 48 may then facilitate rotation of the meter roller 28 within the frame 182. As mentioned above, the opening 214 of the first section 184 may be selectively blocked by the clip 190. The clip 190 includes a cantilever hook tab 216 configured to be selectively inserted into a corresponding retaining pocket 218 of the frame 180 by pushing the cantilever hook tab 216. By enabling an operator to utilize the same meter roller 28 with different frames (e.g., extra fine frame, half width frame, and/or full width frame), fewer meter rollers may be used and better control of the flow of material through the meter roller may be established. The various frames 130, 162, and 182 may enable an operator to selectively control rate of flow of product delivered from the meter roller 28 at a given meter roller rotation speed. That is, the full width 130 may deliver a flow rate of approximately twice as much product over a period of time as product delivered by half width frame 182 over the same period of time. Further, the extra fine frame 130 may deliver product less product than the half width frame 182 over the same time period.

The meter roller cartridge frames 130, 162, and 182 may have substantially different colors from one another, thereby allowing external identification of coarse flow rate adjustments that have been made. For example, the full width frame 130 may colored black, the extra fine frame 162 may be colored white, and the half-width frame 182 may be colored orange. These colors are simply used as examples, and any suitable colors may be used to enable an operator to externally identify the frame 130, 162, and 182.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of configuring an agricultural metering system, comprising:
    coupling one of a first meter roller cartridge frame and a second meter roller cartridge frame to a meter roller to form a meter roller cartridge, wherein the first meter roller cartridge frame has one or more first openings having a first aggregate area, and the second meter roller cartridge frame has one or more second openings having a second aggregate area, different from the first aggregate area; and
    engaging the meter roller cartridge with a meter box of the agricultural metering system;
    wherein the first meter roller cartridge frame comprises a blocking portion configured to block material from entering a first segment of the meter roller;
    wherein one opening of the one or more second openings is configured to align with the first segment of the meter roller to enable the first segment of the meter roller to facilitate flow of the material;
    wherein the first meter roller cartridge frame comprises a slat configured to align with and substantially match a contour of a ring of the meter roller, the ring separates the first segment of the meter roller from a second segment of the meter roller, and the ring and the slat are configured to block the material from flowing between the first segment and the second segment along an axial direction.

2. The method of claim 1, wherein one opening of the one or more first openings is configured to align with a second segment of the meter roller to enable the second segment of the meter roller to facilitate flow of the material.

3. The method of claim 1, wherein coupling one of the first meter roller cartridge frame and the second meter roller cartridge frame to the meter roller comprises engaging a releasable bearing coupler with the meter roller to facilitate rotation of the meter roller within the meter roller cartridge.

4. The method of claim 1, comprising covering an aperture of the first meter roller cartridge frame with a clip to establish the first aggregate area of the one or more first openings.

5. A meter roller cartridge for an agricultural metering system, comprising:
    a frame having a first section configured to enable material to enter a meter roller within the frame and a second section configured to block material from entering the meter roller, wherein the first and second sections are configured to control flow of the material into the meter roller;
    wherein the second section is shaped to substantially match a circumferential profile of the meter roller.

6. The agricultural metering system of claim 5, comprising a dividing slat between the first section and the second section of the frame.

7. The agricultural metering system of claim 5, comprising the meter roller having a first segment and a second segment, wherein the first segment comprises a first plurality of flutes, the second segment comprises a second plurality of flutes, a first configuration of the first plurality of flutes is different than a second configuration of the second plurality of flutes, the first segment aligns with the first section of the frame, and the second segment aligns with the second section of the frame.

8. The agricultural metering system of claim 7, wherein the meter roller cartridge is configured to engage a releasable bearing coupler with the meter roller to facilitate rotation of the meter roller within the meter roller cartridge.

9. The agricultural metering system of claim 5, wherein the second section comprises a clip configured to selectively engage a mounting portion of the frame to block material from entering the meter roller.

10. The agricultural metering system of claim 9, wherein the clip comprises a cantilever hook tab, and the mounting portion comprises a retaining pocket, and the cantilever hook tab is configured to be selectively inserted into the retaining pocket to secure the clip to the mounting portion of the frame.

11. An agricultural metering system, comprising:
    a meter roller having a first segment and a second segment;
    a first meter roller cartridge frame configured to rotatably support the meter roller, wherein the first meter roller cartridge frame comprises:
        a first section configured to enable flow of material into the first segment of the meter roller;
        a second section configured to block flow of the material into the second segment of the meter roller;

a second meter roller cartridge frame configured to rotatably support the meter roller, wherein the second meter roller cartridge frame comprises:
a third section configured to block flow of the material into the first segment of the meter roller; and
a fourth section configured to enable flow of the material into the second segment of the meter roller; and
wherein the meter roller is configured to be inserted into a selectable one of the first meter roller cartridge frame and the second meter roller cartridge frame.

12. The agricultural metering system of claim 11, comprising a releasable bearing coupler configured to couple the meter roller to the first meter roller cartridge frame or to the second meter roller cartridge frame, wherein the releasable bearing coupling is configured to facilitate rotation of the meter roller within the first meter roller cartridge frame or the second meter roller cartridge frame.

13. The agricultural metering system of claim 11, wherein the first meter roller cartridge frame comprises a first color and the second meter roller cartridge frame comprises a second color to facilitate external identification of a selected flow rate.

14. The agricultural metering system of claim 11, wherein the meter roller comprises a ring axially positioned between the first meter roller segment and the second meter roller segment.

15. The agricultural metering system of claim 14, wherein the first meter roller cartridge comprises a slat between the first section and the second section of the first meter roller cartridge frame configured to align with the ring of the meter roller to block material from entering the second segment from the first segment.

* * * * *